United States Patent
Lin et al.

(10) Patent No.: US 8,972,699 B2
(45) Date of Patent: Mar. 3, 2015

(54) MULTICORE INTERFACE WITH DYNAMIC TASK MANAGEMENT CAPABILITY AND TASK LOADING AND OFFLOADING METHOD THEREOF

(75) Inventors: Tai-Ji Lin, Kaohsiung County (TW);
Tien-Wei Hsieh, Taipei (TW);
Yuan-Hua Chu, Hsinchu County (TW);
Shih-Hao Ou, Tainan County (TW);
Xiang-Sheng Deng, Taichung (TW);
Chih-Wei Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1708 days.

(21) Appl. No.: 12/107,082

(22) Filed: Apr. 22, 2008

(65) Prior Publication Data
US 2009/0172683 A1 Jul. 2, 2009

(30) Foreign Application Priority Data
Dec. 31, 2007 (TW) ................................ 96151511 A

(51) Int. Cl.
G06F 9/30 (2006.01)
G06F 9/50 (2006.01)
G06F 9/38 (2006.01)

(52) U.S. Cl.
CPC .............. *G06F 9/505* (2013.01); *G06F 9/3877* (2013.01); *G06F 2209/5017* (2013.01)
USPC ............................................... 712/34; 712/35

(58) Field of Classification Search
USPC ...................................... 712/34, 214; 718/103
See application file for complete search history.

(56) References Cited

U.S. PATENT DOCUMENTS

| | | | |
|---|---|---|---|
| 5,664,095 A * | 9/1997 | Cox et al. | 714/47.2 |
| 5,717,933 A | 2/1998 | Mann | |
| 5,748,468 A * | 5/1998 | Notenboom et al. | 700/3 |
| 5,778,244 A * | 7/1998 | Putnins et al. | 712/15 |
| 5,841,763 A * | 11/1998 | Leondires et al. | 370/260 |
| 6,845,414 B2 * | 1/2005 | Hsu et al. | 710/52 |

(Continued)

FOREIGN PATENT DOCUMENTS

| | | |
|---|---|---|
| CN | 1531240 | 9/2004 |
| TW | I235953 | 7/2005 |

OTHER PUBLICATIONS

Authored by Jen-Pao Huang, article titled "Heterogeneous multicore system for embeded hardward and software collaborative Task Scheduling" adopted from Chinese Master's Theses Full-text Database on Information Science and Technology, 2007, vol. 2, pp. I137-41-1 to I137-41-59, with English abstract.
"1st Office Action of China counterpart application", issued on Jun. 10, 2010, p. 1-p. 12.
"2nd Office Action of China Counterpart Application", issued on Dec. 14, 2010, p. 1-p. 12.

(Continued)

*Primary Examiner* — Jacob A Petranek
(74) *Attorney, Agent, or Firm* — Jianq Chyun IP Office

(57) ABSTRACT

A multicore interface with dynamic task management capability and a task loading and offloading method thereof are provided. The method disposes a communication interface between a micro processor unit (MPU) and a digital signal processor (DSP) and dynamically manages tasks assigned by the MPU to the DSP. First, an idle processing unit of the DSP is searched, and then one of a plurality of threads of the task is assigned to the processing unit. Finally, the processing unit is activated to execute the thread. Accordingly, the communication efficiency of the multicore processor can be effectively increased while the hardware cost can be saved.

21 Claims, 11 Drawing Sheets

(56) References Cited

U.S. PATENT DOCUMENTS 7,082,518 B2 7/2006 Leijten et al.
2008/0201716 A1* 8/2008 Du et al. .................. 718/104

OTHER PUBLICATIONS

"Office Action of Taiwan Counterpart Application", issued on Sep. 27, 2011, p. 1-p. 21.

* cited by examiner

|  | Type | Destination | Queue Pointer | | Program Address |
|---|---|---|---|---|---|
|  |  |  | Head Pointer | Tail Pointer |  |
| TCB[0] (Output) | OUT | NA | 0 | 0 | &Output |
| TCB[1] (VLC) | G | Output | 0 | 0 | &VLC |
| TCB[2] (Q) | G | VLC | 1 | 0 | &Q |
| TCB[3] (DCT) | G | Q | 2 | 1 | &DCT |
| TCB[4] (CST) | G | DCT | 2 | 2 | &CST |
| TCB[5] (Input) | IN | CST | NA | NA | &Input |

FIG. 7

| Processing Unit | Enable | Task |
|---|---|---|
| Processing Unit 0 | 0 | |
| Processing Unit 1 | 0 | |
| Processing Unit 2 | 1 | TCB[5] |
| Processing Unit 3 | 0 | |

(a)

| Processing Unit | Enable | Task |
|---|---|---|
| Processing Unit 0 | 1 | TCB[2] |
| Processing Unit 1 | 0 | |
| Processing Unit 2 | 1 | TCB[5] |
| Processing Unit 3 | 0 | |

Dispatch "Q"
(b)

| Processing Unit | Enable | Task |
|---|---|---|
| Processing Unit 0 | 1 | TCB[2] |
| Processing Unit 1 | 1 | TCB[3] |
| Processing Unit 2 | 1 | TCB[5] |
| Processing Unit 3 | 0 | |

Dispatch "DCT"
(c)

| Processing Unit | Enable | Task |
|---|---|---|
| Processing Unit 0 | 0 | |
| Processing Unit 1 | 1 | TCB[3] |
| Processing Unit 2 | 0 | |
| Processing Unit 3 | 0 | |

Finish "Q & Input"
(d)

FIG. 8

MULTICORE INTERFACE WITH DYNAMIC TASK MANAGEMENT CAPABILITY AND TASK LOADING AND OFFLOADING METHOD THEREOF

CROSS-REFERENCE TO RELATED APPLICATION

This application claims the priority benefit of Taiwan application serial no. 96151511, filed on Dec. 31, 2007. The entirety the above-mentioned patent application is hereby incorporated by reference herein and made a part of specification.

BACKGROUND OF THE INVENTION

1. Field of the Invention

The present invention relates to a multicore interface with dynamic task management capability and a task loading and offloading method thereof.

2. Description of Related Art

As the rapid development of the communication and multimedia applications, the tasks supported by various electronic products in the market tend to be diversified, and accordingly, the operation complexity for the electronic products to process such tasks is also greatly increased. Taking the most popular electronics, the cell phone, for example, besides the basic communication function, it is further integrated with functions of a digital camera, a multimedia player, and even a global positioning system (GPS) and so on.

In order to meet such a high operation requirement and maintain a certain upgrade flexibility, dual-core or multicore heterogeneous processors have been widely accepted as an effective solution. As for the common dual-core processors, one control-oriented micro processor unit (MPU) is used to process tasks such as user interface and interrupt handling. On the other hand, one digital signal processor (DSP) is used together to deal with the real-time tasks with low power consumption and high efficiency, as well as regular computation characteristics, such as fast Fourier transform (FFT) and matrix multiplication.

Such heterogeneous multicore platform combines the advantages of different processors such as MPU and DSP, and thus it achieves a much higher computation efficiency than a single processor, and offers a high design flexibility for providing product differentiation with software. However, due to the lack of relevant development tools and corresponding software abstraction concept, in the early stage of the development of application systems for the heterogeneous multicore platforms, each processor is developed independently. For example, the designers may first design a DSP application module (e.g., developing a DSP-based audio-visual codec), and design/verify the corresponding software, and consider the module as a closed sub-system. Then, the DSP module is communicated through accessing peripheral devices (e.g., hardware codec, accelerator) by the MPU. However, there is no direct interaction between the processors.

Furthermore, in order to follow the trend of increasingly multi-tasked and multithreaded applications, an opportunity for a plurality of different tasks or threads to share the DSP computation resources becomes increasingly high. In addition, in order to enhance the computation efficiency, reduce the requirements for storage resources (e.g., scratchpad SRAM or cache) of the DSP computation, or reduce the priority inversion time of a non-preemptive system, the DSP system tends to perform a further task slicing on the computation operations.

The above factors enable the DSP program development to be further abstracted, and software abstraction hierarchy of the traditional MPU subsystems are further added, such as dynamic task loading and offloading, memory management, multi-task processing and dynamic task scheduling, and interrupt handler. However, it is not easy to further abstract the DSP program development. For example, the DSP is not suitable for processing the control-oriented tasks, since it has a high cost in context switch. Therefore, a special communication interface is expected to be developed between the MPU and the DSP, instead of merely using an abstraction software hierarchy of the DSP, which also provides an identical interface to the MPU.

Currently, most of the relevant products commonly available from the market employ mailbox-abstracted, interrupt-driven inter-processor communications, and a μ-kernel abstracted DSP software hierarchy. DaVinci from Texas Instruments and open multimedia applications platform (OMAP) are both application program interface (API) specifications with a DSP Gateway or DSP/BIOS used to connect an entirely-wrapped IPC mechanism, DSP/BIOS, DSP μ-kernel, and eXpress DSP Algorithm Interoperability Standard (xDAIS).

The above software architecture may be substantially represented by the open source software architecture being developed currently. FIG. 1 shows a conventional open source software architecture. Referring to FIG. 1, in this open source software architecture, a software abstraction level of an MPU 110 is moved to a DSP 120, and interrupt-driven inter-processor communications are employed, which, however, would seriously influence the efficiency of the DSP subsystem. Taking the Framework from Texas Instruments for example, there is a significant performance degradation (over 50%) between the efficiency data of the codec indicated in the application notes (including the common H.264, MPEG-2, AAC, MP3, G.71x, and so on) and the hand-optimized version thereof, due to the reasons listed below.

1. The DSP architecture design has been optimized for predictable computations with a high repetitiveness, but it requires a high cost for program control and interrupt handler.

2. The DSP is built in with a large number of registers for processing a large sum of data stream, but its built-in data memory may include no abstraction level of a cache to achieve execution predictability, and as a result, such a design architecture has a higher cost for the context switch.

3. The DSP generally includes function modules for special usage such as a bit-manipulation unit, Galois-field arithmetic unit, and in this manner, it is a waste of resources to execute simple logic computations in the μ-kernel with such high-cost processor.

In view of the above problems, some primary solutions have been proposed, such as Blackfin DSP architecture with an enhanced program control and interrupt handler mechanism developed jointly by Analog Devices Corporation and Intel Corporation, which is even alleged to be able to replace the MPU to become a sole system processor core in a low cost system. However, this architecture not only makes hardware investment the same as the hardware resource of the MPU to strengthen the program control and interrupt handler, but makes software investment of the same software resources, such as replanting the system software, driver, legacy, and other applications of ARM/MIPS and X86MPU of the original MPU.

As such, one way is to analyze applications with compiler techniques, which only allows its processing unit to take preemption in a relatively small context. Another way is to employ many sets of descriptors, so as to reduce the overheads of the DSP on the context switch. However, the disadvantage of the above manners lies in requiring a great deal of static analysis, and the complexity of the program control is increased as well.

A DSP from Philips Corporation provides two instruction sets, in which one is a normal instruction set, and the other is a compact instruction set. The compact instruction set only allows accessing a part of the resources in the DSP such as a few registers. After an interruption occurs, if the interrupt service routine (ISR) only uses instructions from the compact instruction set, the cost of making a context switch is greatly reduced. However, as the instruction length of the compact instruction set is relatively short, only a part of the resources of the DSP can be accessed, and accordingly, the execution efficiency would also be influenced.

AMD Corporation proposes to reserve a set of registers to be used in program sections that would not be interrupted (e.g., interrupt service routine (ISR)). If other registers would be used in the ISR, the values may be first stored in the reserved registers, and then stored back to the original registers after processing the ISR, such that the time required for context switch may be reduced. However, the disadvantage of this manner lies in that the cost of an additional set of registers is required.

SUMMARY OF THE INVENTION

Accordingly, the present invention generally relates to a task loading and offloading method of a multicore interface with dynamic task management capability, in which an idle processing unit in a digital signal processor (DSP) is searched and a task is dispatched in sequence to the processing unit for execution, and thus enhancing the communication efficiency between processors.

The present invention generally relates to a multicore interface with dynamic task management capability, in which a controller that works independently is used to dynamically manage tasks dispatched to a DSP, and thus saving the hardware resources.

As exemplary embodied and broadly described herein, the present invention provides a task loading and offloading method of a multicore interface with dynamic task management capability, which is adapted to dispose a communication interface between a first processor and a second processor, for dynamically managing tasks assigned to the second processor by the first processor. The method includes first searching for an idle processing unit in the second processor, then assigning one of a plurality of threads of the above task to the processing unit, and finally activating the processing unit to execute the thread.

The present invention provides a multicore interface with dynamic task management capability, which is disposed between the first processor and the second processor, and includes a first processor controller, a second processor controller, and a task controller. The first processor controller is coupled to the first processor for receiving a command from the first processor, and receiving a task assigned to the second processor by the first processor. The second processor controller is coupled to the first processor controller and the second processor for receiving a command from the second processor, and searching for an idle processing unit in the second processor. The task controller is coupled to the second processor controller for receiving a command from the second processor controller, assigning one of a plurality of threads of the task to the processing unit, and giving a command to the second processor controller to activate the processing unit for executing the thread.

To make the above and other objects, features, and advantages of the present invention be more comprehensible, the present invention is further described below in great detail through the exemplary embodiments set forth below accompanied with drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7 shows a task queue of a JPEG image compression according to an exemplary embodiment of the present invention.

FIG. 8 shows a thread dispatch table of a JPEG image compression according to an exemplary embodiment of the present invention.

DESCRIPTION OF THE EMBODIMENTS

Figure 1:
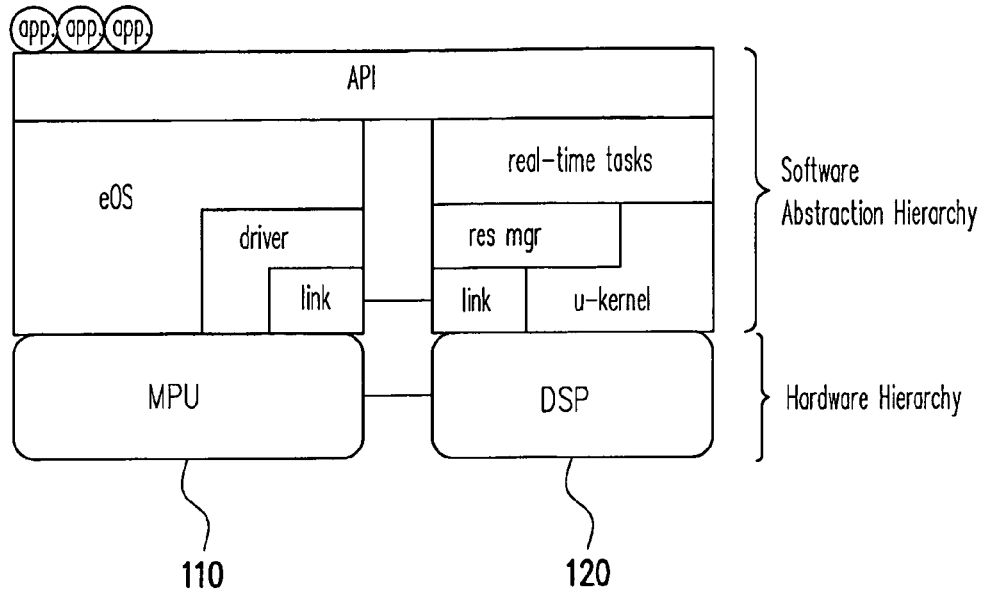
FIG. 1 shows a conventional open source software architecture.

Reference will now be made in detail to the present exemplary embodiments of the invention, examples of which are illustrated in the accompanying drawings. Wherever possible, the same reference numbers are used in the drawings and the description to refer to the same or like parts.

To effectively assist communications between dual-core or multicore processors including transmitting data, dispatching tasks, and dynamically managing tasks assigned to a digital signal processor (DSP) by a micro processor unit (MPU), the present invention provides a special communication interface and a task loading and offloading method using the communication interface, so as to achieve the above functions. To make the present invention be more comprehensible, the exemplary embodiments listed below are taken as examples for implementing the present invention.

Figure 2:
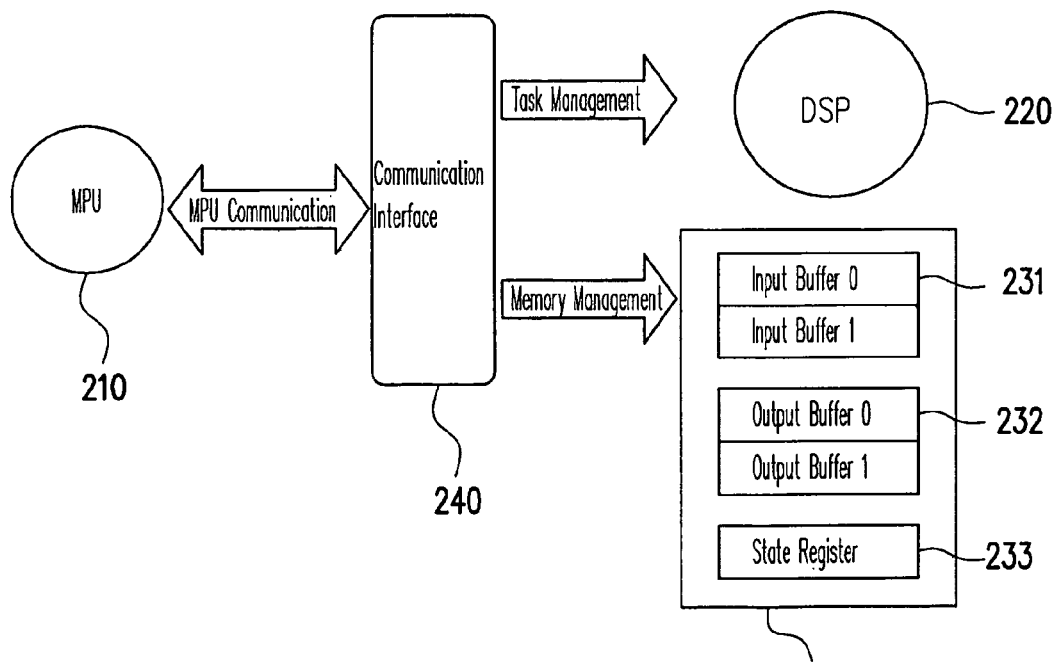
FIG. 2 is a schematic view of a multicore interface with dynamic task management capability according to an exemplary embodiment of the present invention.

FIG. 2 is a schematic view of a multicore interface with dynamic task management capability according to an exemplary embodiment of the present invention. Referring to FIG. 2, a communication interface 240 in this exemplary embodiment is disposed between an MPU 210 and a DSP 220. Double input buffers 231 and output buffers 231 are disposed in a data memory 230 of the DSP 220 to increase the data transmission efficiency. When the MPU 210 is intended to transfer data to the DSP 220, it first views a state register 233. The state register 233 informs the MPU 210 about an input buffer of the data memory 230 where the data can be currently transferred there-to. Then, the MPU 210 places the data to the input buffer. In contrast, once the data is successfully placed therein, the MPU 210 writes a corresponding command to the communication interface 200. Then, the communication interface 200 sets the corresponding state register 233 to indicate that the data has been received, and meanwhile instructs the MPU 210 to transfer data to the other input buffer next time.

When the DSP 220 finishes the task and needs to transfer the processed data to the MPU 210, the communication interface 200 informs the MPU 210 to take back the data through an mailbox in an interrupt manner. When the MPU 210 has taken back the data, it writes a command to the communication interface 200 to inform it that the data has already been taken out. In other words, when the MPU 210 is intended to input the data to the DSP 220, it can immediately place the data after reading the state register 233 by itself, without waiting for a response from the DSP 220 or interrupting the computation of the DSP 220. Furthermore, once the data has been computed, the communication interface 200 also informs the MPU 210 promptly. In this way, the data transmission efficiency may be increased significantly, without wasting time on waiting for each other.

On the other aspect, this exemplary embodiment further defines a set of system control variables to control the DSP 220 to execute the task. The TCB data is used to record a state of each thread, and a task queue is used to record an address of the data memory where the source data is placed when computing each thread.

The TCB data includes the following information: type, for indicating the task mode of the thread, including input, output, or general task; destination, for indicating a name of the next task of the task, for example, the next task of a color space transformation (CST) is a discrete Cosine transformation (DCT); head pointer and tail pointer, for indicating the data using situation in the current task queue, in which the data pointed by the tail pointer is the data needed to be computed recently, whereas the head pointer points to the data transferred after the previous task is finished, and it can determine which data are waiting for being computed and which data have already been computed simply through the head pointer and tail pointer; and program address (ptr), for indicating an address of the instruction memory (a start address) where the program code of the thread is stored.

In addition to the TCB data and task queue, the system control variables further include one thread dispatch table, and the information stored therein indicates an address of the memory where the TCB data of the thread currently computed by each processing unit is stored. When the processing unit begins executing each thread, it views the TCB data of the corresponding thread according to the address recorded in the thread dispatch table.

It should be noted that, in the present invention, the task assigned by the MPU is split into a plurality of threads according to the property. As for each thread to be managed, the communication interface imparts one "single and fixed" priority to each thread. The priority relationship is used to determine the sequence for storing the TCB data of these tasks.

Figure 3:
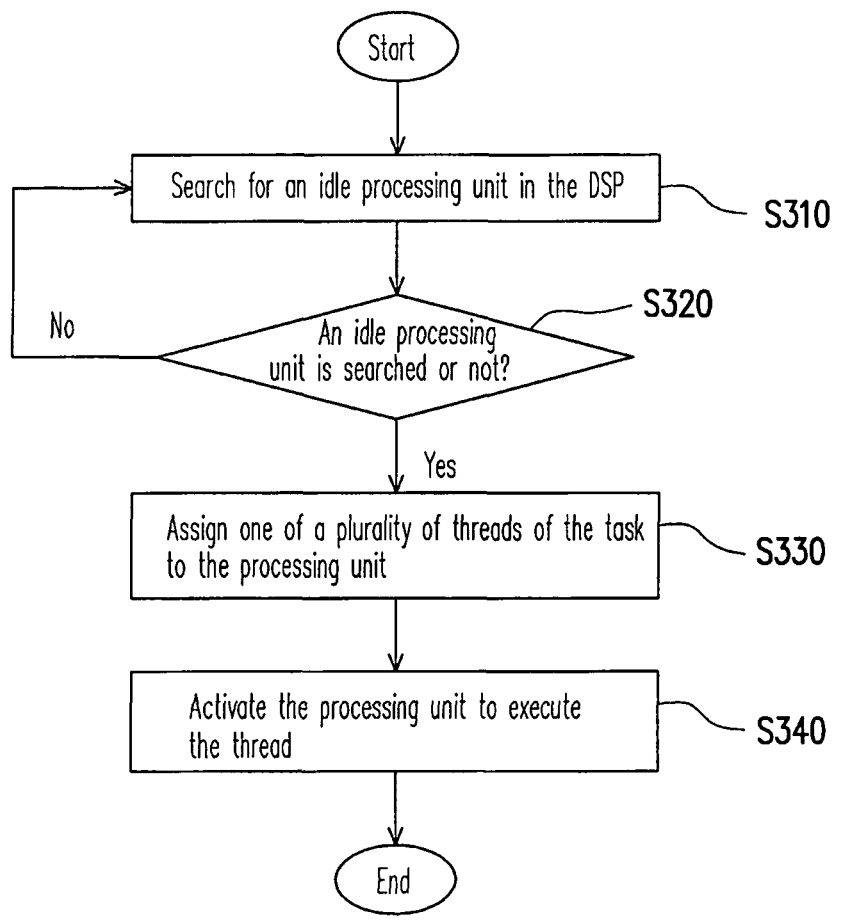
FIG. 3 is a flow chart of a task loading and offloading method of the multicore interface with dynamic task management capability according to an exemplary embodiment of the present invention.

After the system is booted, the communication interface begins to perform a dynamic task management, which mainly includes a task scheduling and a task loading. FIG. 3 is a flow chart of a task loading and offloading method of a multicore interface with dynamic task management capability according to an exemplary embodiment of the present invention. Referring to FIG. 3, this exemplary embodiment is adapted to use a communication interface disposed between the first processor and the second processor to dynamically manage tasks assigned to the second processor by the first processor. In this exemplary embodiment, the first processor is, for example, the MPU, and the second processor is, for example, the DSP.

First, when the system is booted, the communication interface monitors the thread dispatch table, and views the current working state of each processing unit in the DSP to find out an idle processing unit (Step S310). In addition to recording the working state of each processing unit in the DSP, the thread dispatch table also records the address of the TCB data required by each processing unit for executing the thread.

If any idle processing unit is found, the communication interface reads the task queue to search for a thread that has not be processed currently and listed ahead, and assigns the thread to the processing unit (Step S320). Particularly, the communication interface views the task queue, and starts viewing from the task with the highest priority. If the head pointer and tail pointer in the TCB data of these threads indicate that there is still data to be processed, the communication interface schedules the thread with the highest priority into the processing unit for being executed; otherwise, it further proceeds to view the thread with the next highest priority.

After the communication interface has found a thread to be scheduled, the task loading is then performed to activate the processing unit for executing the thread (Step S330). The communication interface enables the processing unit enable signal corresponding to the processing unit (e.g., set to 1). At this time, the processing unit starts accumulating the instruction counter, so as to start executing the thread. Another example is listed below to illustrate the detailed flow of executing the thread by the DSP.

Figure 4:
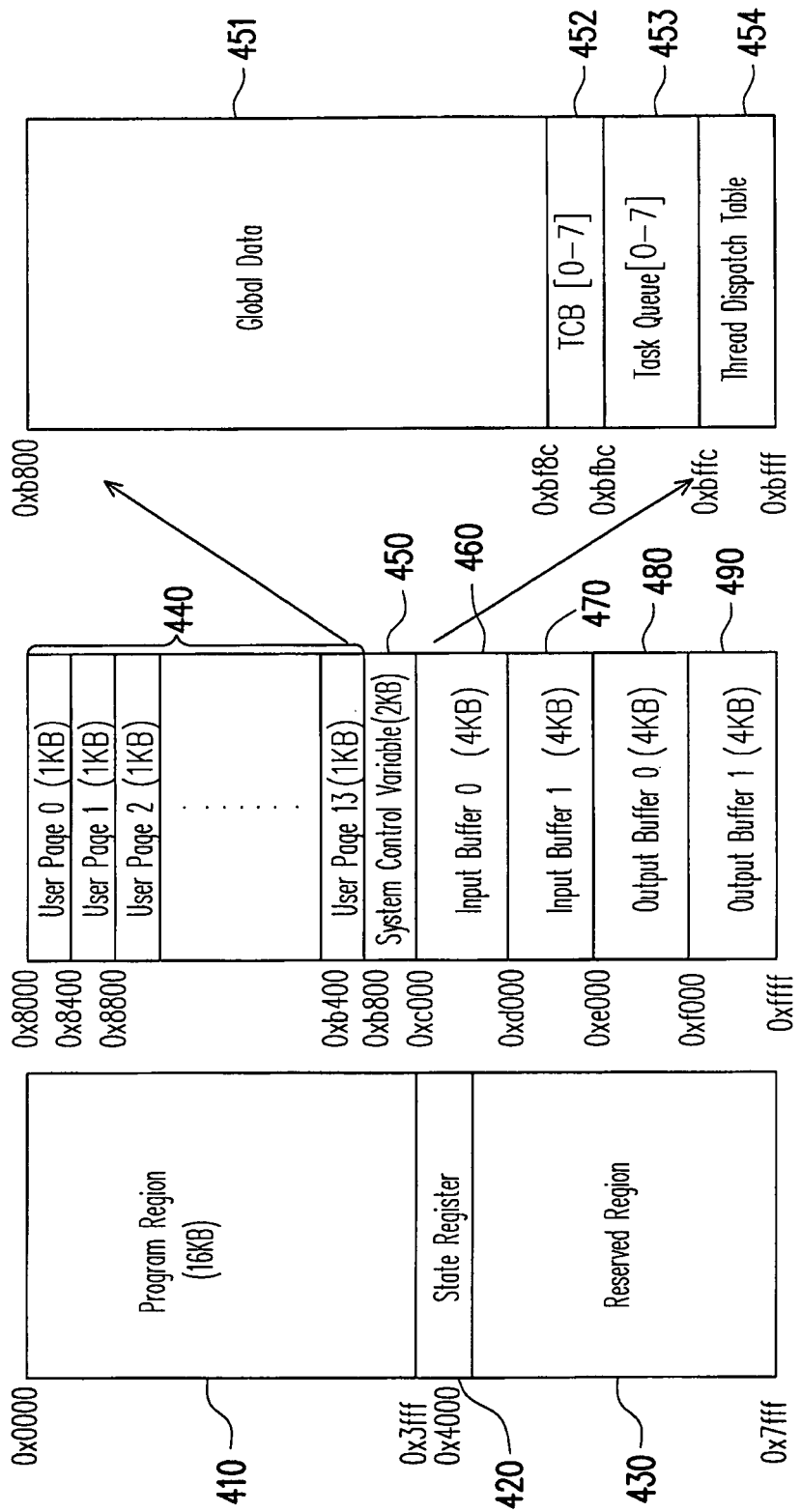
FIG. 4 is a schematic view of a memory mapping of a DSP data memory in an MPU addressing space according to an exemplary embodiment of the present invention.

Before introducing the method of executing the task by the DSP, an exemplary embodiment is listed below to illustrate the configuration of the data memory of the DSP. FIG. 4 is a schematic view of a memory mapping of a DSP data memory in an MPU addressing space according to an exemplary embodiment of the present invention. Referring to FIG. 4, besides a program region 410 and a reserved region 430 of the DSP, a data memory 400 in this exemplary embodiment further includes a state register 420 reserved for being used by the communication interface.

Furthermore, this exemplary embodiment also includes cutting the data memory 400 into several user pages 440 with a fixed size (including the user page 0 to the user page 13), which are dynamically assigned to each processing unit of the DSP by the communication interface as working spaces, so as to store the source data for the DSP computation or computation results thereof.

The system control variable region 450 records global data 451 of the system, the TCB data 452, task queue 453, and thread dispatch table 454. Furthermore, the data memory 400 also includes disposing double input buffers 460, 470 and output buffers 480, 490, so as to enhance the data transmission efficiency.

Figure 5:
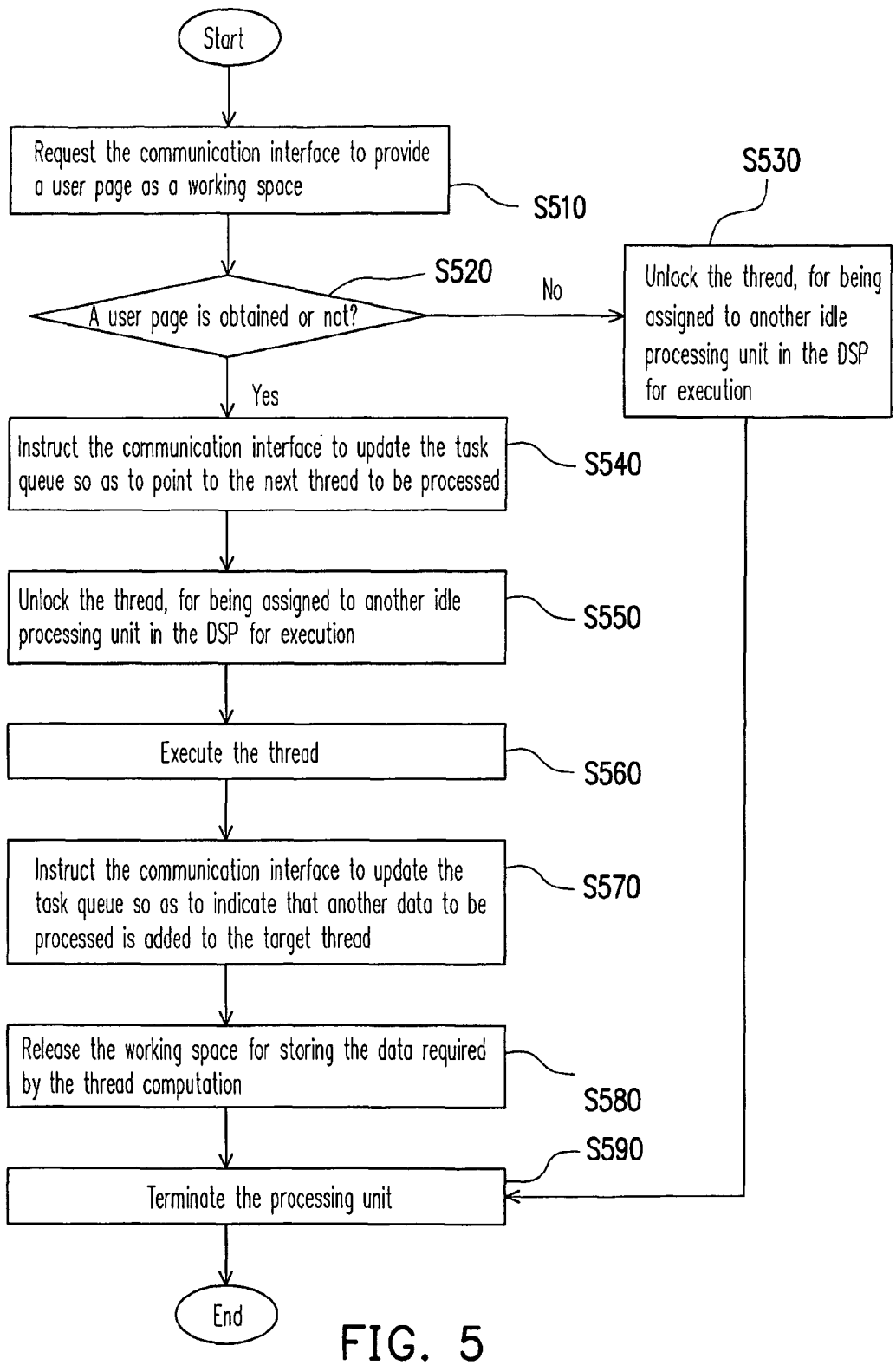
FIG. 5 is a flow chart of a method of executing a task by the DSP according to an exemplary embodiment of the present invention.

FIG. 5 is a flow chart of a method of executing a task by the DSP according to an exemplary embodiment of the present invention. Referring to FIG. 5, in this exemplary embodiment, an instruction memory and a data memory of the DSP, the register of the communication interface, and the recorded system control variables are all used to control the DSP to execute the task accordingly.

When the communication interface schedules the thread and loads it into the processing unit of the DSP for computation, get_free_page( )API is executed first, i.e., requesting the communication interface to provide a user page as a working space (Step S510), for storing the data obtained after the computation is finished successfully. At this time, the communication interface monitors whether there is any idle user page available in the data memory (Step S520).

If there is no idle user page available, unlock( )API is executed to inform the communication interface that the task can be re-scheduled for computation (Step S530), and then terminate( )API is executed to terminate the execution of the task (Step S590). Otherwise, if a user page is obtained successfully, de-queue( )API is executed next, i.e., the communication interface is informed to update the tail pointer in the TCB, so as to point to the next data to be processed (Step S540).

Then, unlock( )API is executed, i.e., the communication interface is informed that the task can be re-scheduled for computation, and then the next thread to be processed is assigned to another idle processing unit in the DSP for execution (Step S550). After the above operations have been finished, the DSP can start executing the real computation operation (Step S560).

After the computation is finished successfully, en-queue( )API is executed, i.e., the communication interface is informed to update the head pointer in the TCB data of the target thread of the thread, so as to indicate that another data to be processed is added to the target thread (Step S570).

Finally, page_release( )API is executed, i.e., the user page just occupied by storing the computation data source (input data) is released (Step S580), and then, terminate( )API is executed to terminate the execution of the task (Step S590). It should be noted that, the user page used herein is not the user page obtained by get_free_page( )API at the very beginning when starting the execution, but the user page used to store the computation data source at the beginning. That is to say, the user page obtained by get_free_page( )API would become the user page used to store the operation data source of the target thread.

To make the content of the communication interface and the task loading and offloading method thereof become more comprehensible, an image compression application, Joint Photographic Coding Expert Group (JPEG), commonly used in multimedia applications will be described below as an example for demonstrating how the communication interface of the present invention assists the MPU and the DSP in making communications and dynamic task management.

Figure 6:
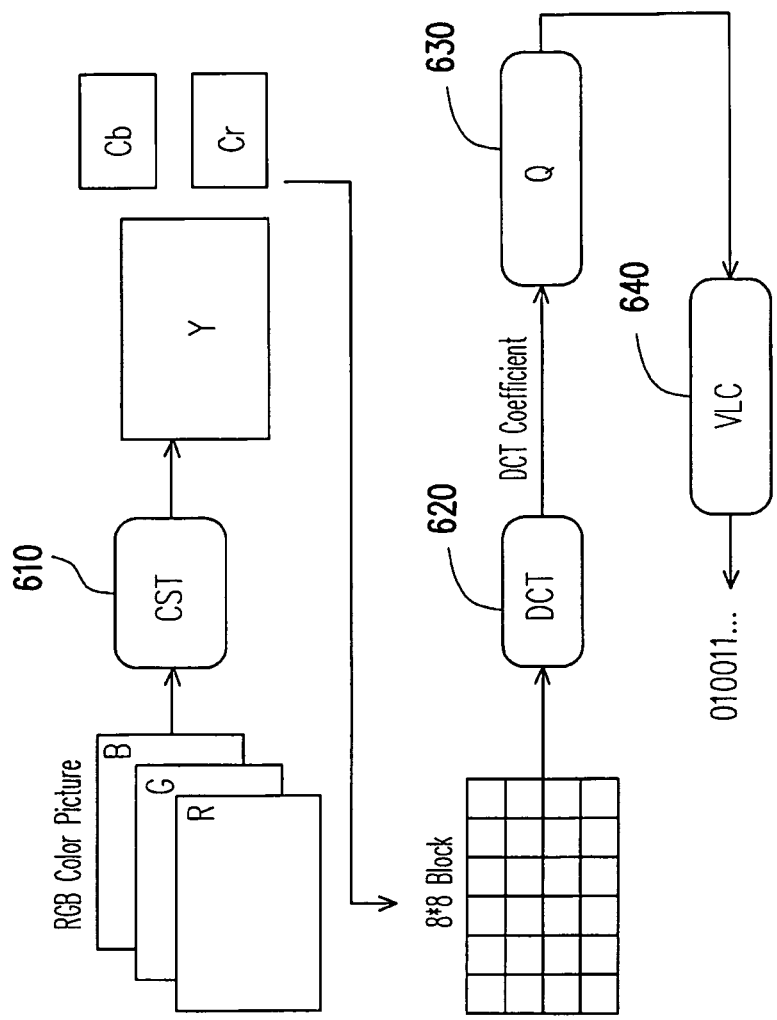
FIG. 6 is a schematic view of a JPEG image compression procedure according to an exemplary embodiment of the present invention.

FIG. 6 is a schematic view of a JPEG image compression procedure according to an exemplary embodiment of the present invention. Referring to FIG. 6, in this exemplary embodiment, the JPEG image compression procedure is split into four threads of color space transformation (CST) 610, discrete cosine transformation (DCT) 620, quantization (Q) 630, and variable length coding (VLC) 640.

FIG. 7 shows a task queue of a JPEG image compression according to an exemplary embodiment of the present invention. Referring to FIG. 7, when the communication interface receives a JPEG image compression task dispatched by the MPU, it splits the JPEG image compression task into the above threads of CST, Q, DCT, and VLC, and imparts one single and fixed priority to each thread as a reference for task scheduling. In the JPEG image compression, the VLC has the highest priority, the Q and DCT sequentially have the next highest priority, and the CST is the last one with the lowest priority.

The task queue 700 arranges the execution sequence of each thread according to their priority. The first row is used to record the output TCB data (TCB[0]), in which the task is to transfer the data computed by the DSP to the MPU. The second row is used to record the TCB data (TCB[1]) of the VLC task, and as known from the destination field that, it receives the previous quantization (Q) data, and reads the VLC program via the memory address pointed by the program address and the VLC so as to perform the VLC computation. In this way, the other rows of the task queue 700 are used to record the TCB data of the Q, DCT, CST and Input tasks respectively.

When executing each thread in the task queue 700, the communication interface reads the thread dispatch table first to search for an idle processing unit, so as to dispatch the threads in the task queue 700 to the processing unit. FIG. 8 shows a thread dispatch table of a JPEG image compression according to an exemplary embodiment of the present invention. Referring to FIG. 8(*a*), it is assumed that there are only 4 processing units in the DSP in this exemplary embodiment. It can be known from the enable field of the thread dispatch table 810 that, only the processing unit 2 is involved in computation currently, and as known from its task field that, it is the data of TCB[5] that is executed by the processing unit 2. Referring to the task queue 700 in FIG. 7 again, it can be known that the processing unit 2 executes an Input computation.

It should be noted that, as known from the queue pointer in the task queue 700 that, the head pointer of Q is 1 and the tail pointer is 0, which indicates that the Q has not been executed and it is waiting to be scheduled into the thread dispatch table 810 for execution. At this time, as known from the thread dispatch table 810 that, the processing unit 0 is in an idle state, so the Q is dispatched to the processing unit 0 for execution, and the thread dispatch table 810 is updated into a thread dispatch table 820 of FIG. 8(*b*).

Similarly, the head pointer of DCT in the task queue 700 is 2 and the tail pointer is 1, which indicates that the DCT has not been executed and it is waiting to be scheduled into the thread dispatch table 820 for execution. At this time, as known from the thread dispatch table 820 that, the processing unit 1 is in an idle state, so the DCT is dispatched to the processing unit 1 for execution, and the thread dispatch table 820 is updated into a thread dispatch table 830 of FIG. 8(*c*).

Finally, when the Q and Input computations are finished, the processing unit 0 and the processing unit 2 are restored to the idle state, and the thread dispatch table 830 is updated into a thread dispatch table 840 of FIG. 8(*d*). In this way, the communication interface of the present invention executes the steps of dispatching the task and activating the processing unit for computation repeatedly with reference to the above task queue and the thread dispatch table, until all the threads in the task queue have been computed.

Figure 9:
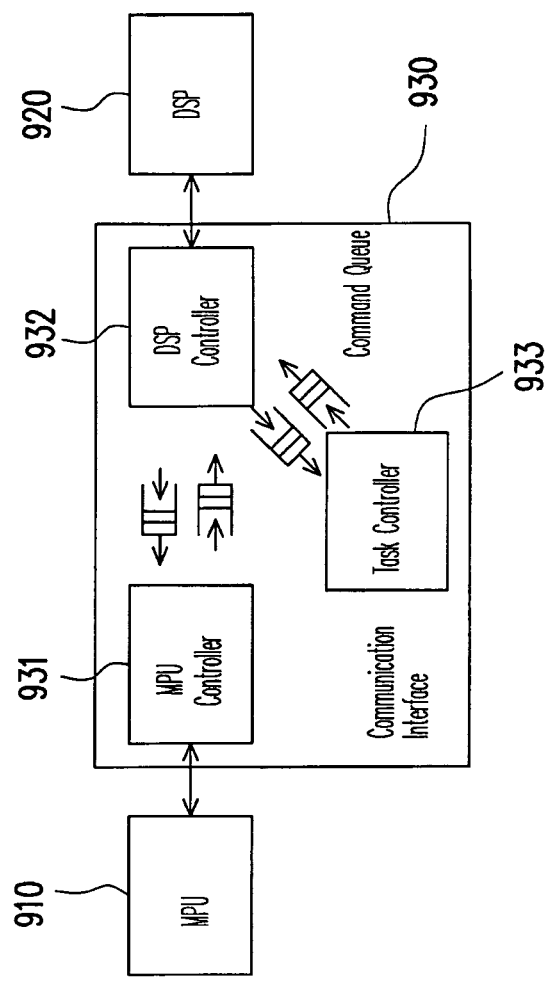
FIG. 9 is a block diagram of a multicore interface with dynamic task management capability according to an exemplary embodiment of the present invention.

According to the above communication interface concept and the task loading and offloading method thereof, the present invention also provides a hardware architecture that may be achieved thereby. FIG. 9 is a block diagram of a multicore interface with dynamic task management capability according to an exemplary embodiment of the present invention. Referring to FIG. 9, a communication interface 930 in this exemplary embodiment includes three interactive controllers, namely, an MPU controller 931, a DSP controller 932, and a task controller 933, to achieve communications and dynamic task management functions between the DSP and MPU. A command queue is used to deliver commands among the three controllers.

Figure 10:
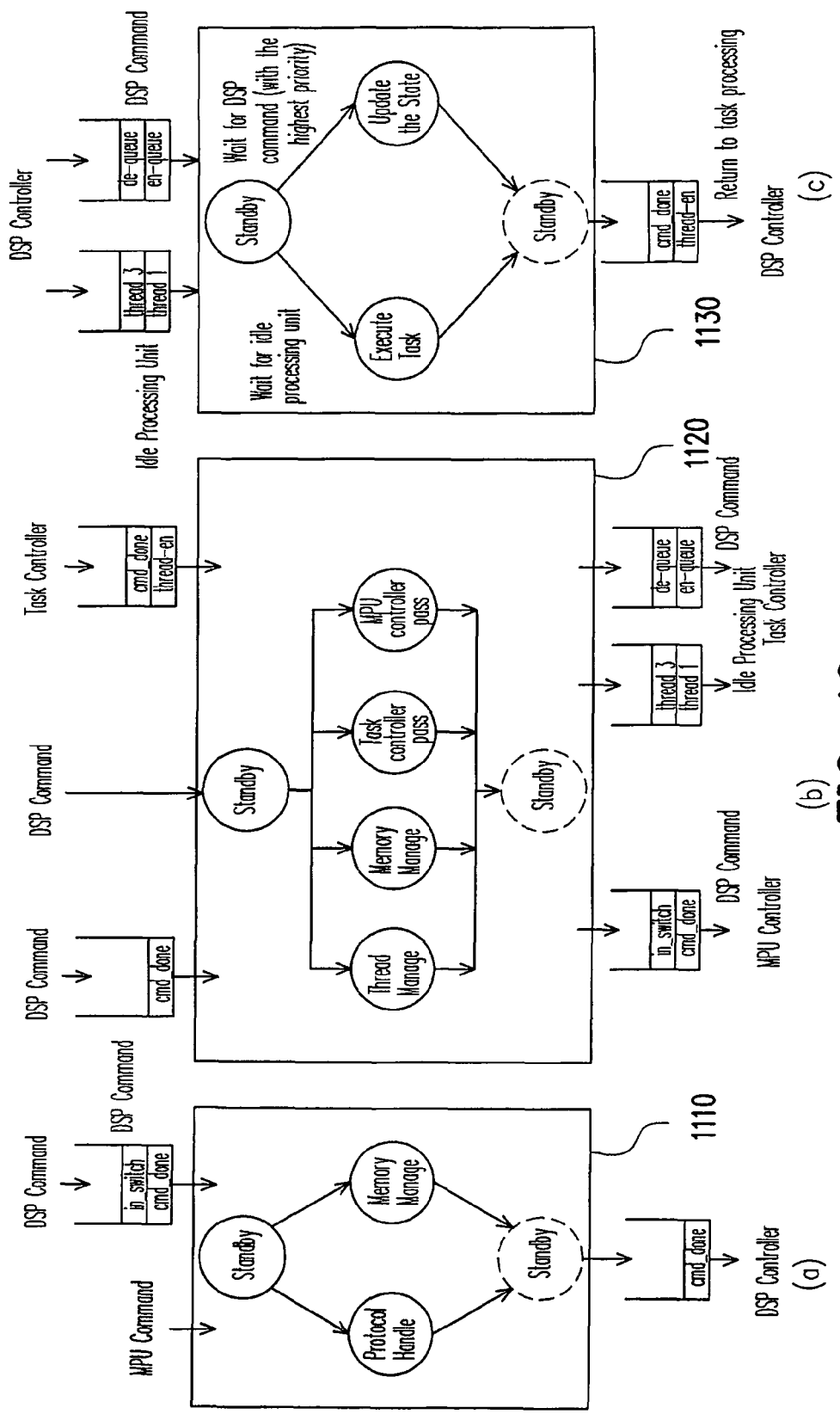
FIG. 10 is a schematic view of state machines of an MPU controller, a DSP controller, and a task controller according to an exemplary embodiment of the present invention.

The functions of the three controllers may be achieved by three simple state machines. FIG. 10 is a schematic view of state machines of the MPU controller 931, the DSP controller 932, and the task controller 933 according to an exemplary embodiment of the present invention. Referring to FIG. 9 and FIG. 10(a), it shows a state machine 1110 of the MPU controller 931. When the system is booted, the MPU controller 931 is in a Standby state, which may receive a command from the MPU 910 or a command from the DSP controller 932. The command from the MPU 910 includes: (1) a data place-in command, for indicating that the MPU has placed the data into the input buffer, and (2) a data take-out command, for indicating that the MPU has taken out the data from the output buffer. The command from the DSP controller 932 includes: (1) a data take-out command, for indicating that the DSP has taken out the data from the input buffer, and (2) a data place-in command, for indicating that the DSP has placed the data to be transferred to the MPU into the output buffer.

When the MPU 910 has placed the data into the input buffer, the MPU controller 931 changes the state register to instruct the MPU 910 to place the data into the other input buffer next time, and meanwhile, sets the state of the data buffer where the data is placed as full. When the MPU 910 has taken out the data from the output buffer, the state register is changed to instruct the MPU 910 to take back the data from the other output buffer next time, and meanwhile, sets the state of the output buffer where the data is taken out as empty.

On the other aspect, when the DSP 920 has taken out the data from the input buffer, the MPU controller 931 changes the state register to instruct the DSP 920 to take out the data from the other input buffer next time, and meanwhile, changes the state of the input buffer where the data is taken out to empty. Finally, when the DSP 920 has placed the data to be transferred to the MPU into the output buffer, the DSP 920 informs the MPU 610 of the output buffer for being output through mailbox in an interrupt manner. Furthermore, when the command from the DSP controller 932 is successfully finished by the MPU controller 931, a message is sent back to the DSP controller 932 in response, and upon receiving the response, the DSP controller 932 continues to execute.

Figure 11:
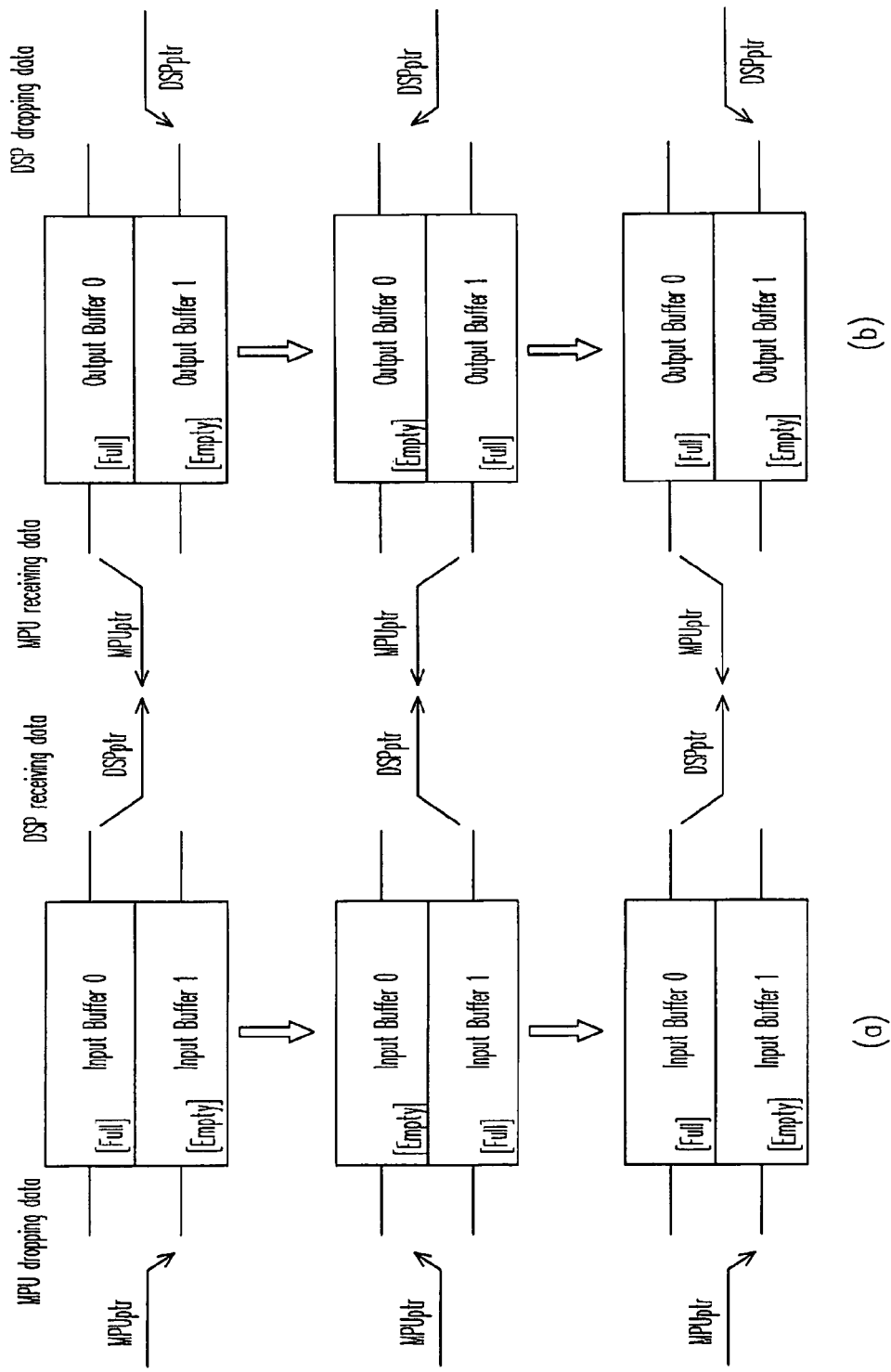
FIG. 11 is a schematic view of operations of output and input buffers according to an exemplary embodiment of the present invention.

For example, FIG. 11 is a schematic view of operations of output and input buffers according to an exemplary embodiment of the present invention. FIGS. 11(a) and 11(b) show operation situations of the input buffers and output buffers respectively. MPUptr represents an address of the input buffer or output buffer pointed by the MPU 910 according to the instruction from the state register. DSPptr represents an address of the input buffer or output buffer pointed by the DSP 920 according to the instruction from the state register. As known from FIGS. 11(a) and 11(b) that, the communication interface of the present invention provides double input buffers or output buffers for the interaction between the MPU 910 and the DSP 920, so as to enhance the data transmission efficiency.

Then, FIG. 10(b) shows a state machine 1120 of the DSP controller 932. When the DSP controller 932 is in a Standby state, it may receive a command from the DSP 920 or a command from the MPU controller 931 or task controller 933. There are eight commands from the DSP 920, including: (1) memory release command, (2) memory get command, (3) de-queue command, (4) en-queue command, (5) task unlock command, (6) processing unit terminate command, (7) data take-out command for indicating that the DSP has taken out the data from the input buffer, and (8) data place-in command for indicating that the DSP has placed the data to be transferred to the MPU into the output buffer.

The de-queue and en-queue commands may be directly transferred to the task controller 933 for processing. The data take-out command for indicating "the DSP 920 has taken out the data from the input buffer" and the data place-in command for indicating that "the DSP has placed the data to be transferred to the MPU into the output buffer" may be directly transferred to the MPU controller 931 for processing.

When executing the memory get command, the DSP controller 932 searches an idle user page in the data memory as a working space for the DSP 920, and meanwhile sets the state of the user page as busy. On the contrary, when executing the memory release command, the user page to be released by the DSP 920 is set as free. Upon receiving the task unlock command, the DSP controller 932 changes the state of the thread from lock to unlock, which indicates that the thread may be rechecked by the task controller 933 to determine whether it can be dispatched to the processing unit of the DSP 920 for computation. Furthermore, upon receiving the processing unit terminate command, the DSP controller 932 sets the processing unit enable signal of the processing unit as 0, i.e., terminating accumulating the instruction counter, and transfers a processing unit idle command to inform the task controller 933 that an idle processing unit is existed for being rescheduled. Finally, when the commands transferred to the MPU controller 931 or task controller 933 have been successfully processed, a command is sent back to inform that the processing is completed.

FIG. 10(c) shows a state machine 1130 of the task controller 933, which receives three commands from the DSP controller 932, namely, (1) a processing unit idle command, (2) a de-queue command, and (3) an en-queue command. The priority of the command (2) or (3) is higher than that of the command (1). When the processing unit idle command is to be processed, the task controller reads the TCB data of the thread with the highest priority, and confirms whether there is any data that has not been processed. If so, the address of the TCB data of the thread is written to the thread dispatch table, and the processing unit start command is sent to the DSP controller 932, to enable the processing unit enable signal of the DSP controller 932. At this time, the instruction counter of the processing unit begins to be accumulated. Otherwise, if there is no data to be processed in the thread with the highest priority, or the thread is in a lock state, it proceeds to search for the thread with the next highest priority, until one schedulable thread is found or all the threads have been searched once.

Furthermore, upon receiving the de-queue command, the task controller 933 updates the tail pointer in the TCB data of the thread computed by the processing unit, i.e., pointing to the next data to be processed of the thread. Upon receiving the en-queue command, it updates the head pointer in the TCB data of the target thread of the thread, so as to indicate that another data to be processed is added to the target thread.

Figure 12:
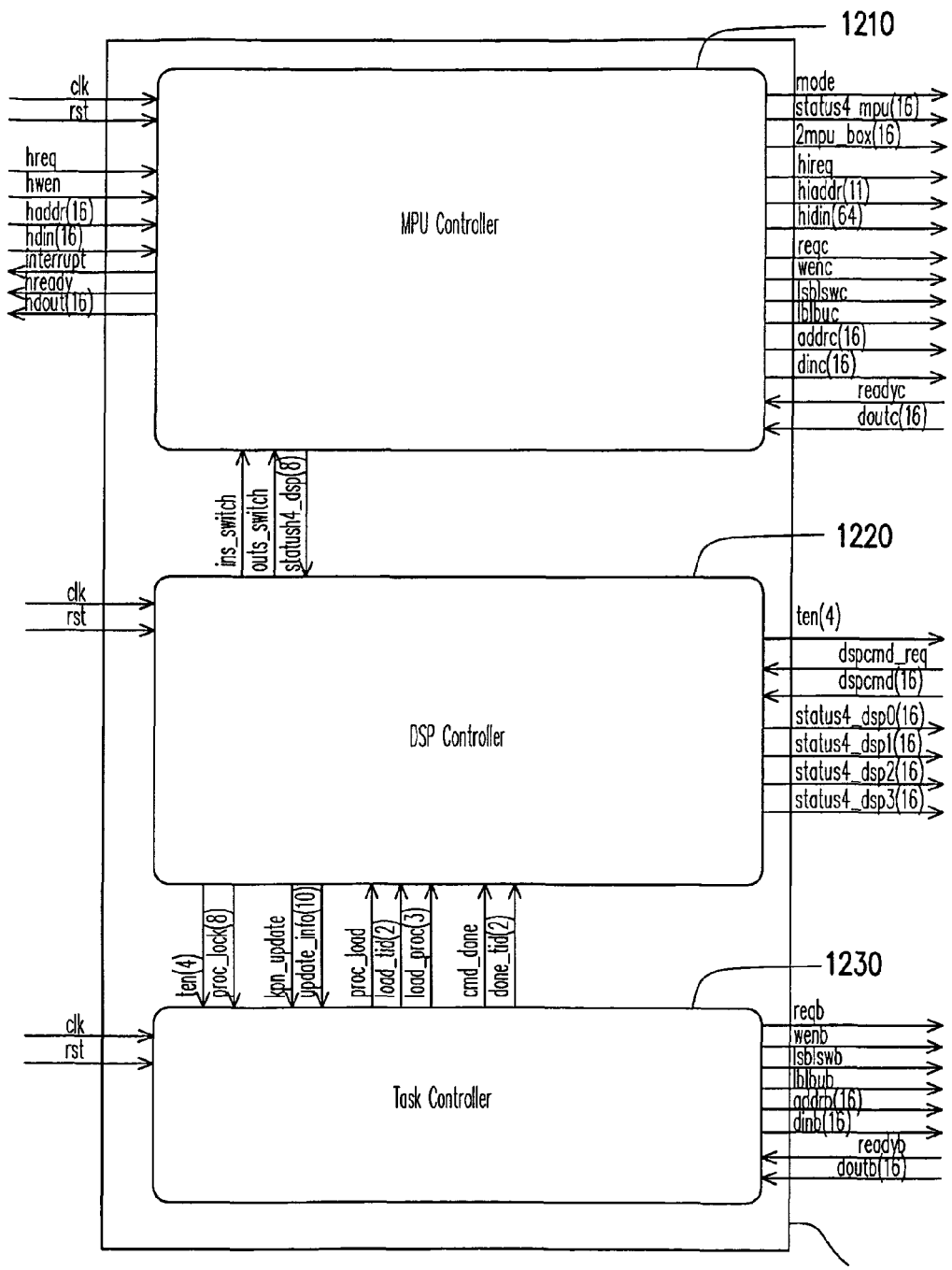
FIG. 12 is a schematic view of a micro-architecture and output and input pins of the communication interface of FIG. 9 according to an exemplary embodiment of the present invention.

The performance of the communication interface provided by the present invention is estimated below through experiments. FIG. 12 is a schematic view of a micro-architecture and output/input pins of the communication interface of FIG. 9 according to an exemplary embodiment of the present invention. Referring to FIG. 12, in the experiments of this exemplary embodiment, an MPU controller 1210, a DSP controller 1220, and a task controller 1230 are connected to form a communication interface 1200. The numbers in the brackets indicate a bit-width of a signal. This exemplary embodiment aims at testing the increasing extent of the communication efficiency between the MPU and DSP after the communication interface is added between the dual-core processors. The performance of each method is directly estimated by DSP utilization in this exemplary embodiment.

In this exemplary embodiment, the Versatile from ARM Corporation is used as a development platform for making experiments. The MPU on the board is used together with a DSP provided with 8 hardware processing units for executing tasks. The two processors are connected by the AMBA (advanced microcontroller bus architecture) bus.

In this exemplary embodiment, the JPEG image compression application commonly used in the multimedia applications is used to demonstrate how the communication interface of the present invention assists the MPU and the DSP in making communications and dynamic task management. The JPEG image compression is split into 4 threads of color space transformation (CST), discrete cosine transformation (DCT), quantization (Q), and variable length coding (VLC). The communication interface imparts one single and fixed priority to each thread as a reference for task scheduling. Taking the JPEG image compression as an example, the VLC has the highest priority, the Q and DCT have the next highest priority, and the CST is the last one with the lowest priority.

This exemplary embodiment includes three experiments: the first experiment is to achieve the function of the communication interface of the present invention through the MPU by means of software, that is to say, the dynamic task managements are all handled by the MPU, and the DSP only receives a command from the MPU for starting computation, and interrupts the MPU to inform that the task is over after finishing the computation successfully. The second experiment is also to achieve the dynamic task management by means of software, but one particular processing unit in the DSP is used to perform the dynamic task management, and the other 7 processing units are used for common computations. The third experiment is to achieve the communication interface of the present invention through additional hardware.

The primary experiments prove that, in the first experiment, the DSP utilization (the cycle number that DSP executes effective instructions and the cycle number of the entire JPEG execution) is about 55.5%, and it is increased to 66.7% in the second experiment. With the communication interface provided by the present invention, the DSP utilization can be increased to 93.4%.

To sum up, besides coordinating the MPU and the DSP and enhancing the communication efficiency, the multicore interface of the present invention further has the dynamic task management capability. With a customized design, the multicore interface of the present invention can achieve a software abstraction hierarchy with the least hardware resources, which is generally achieved through a bulk operating system together with a DSP, and an interface identical to the original interface is provided for the MPU, such that the programmers do not need to exert a lot of efforts on modifying the application that has been developed. The primary experiments show that, the communication interface of the present invention can assist to increase the DSP utilization in the dual-core processor to nearly 93.4%, and the required hardware cost (silicon area) is only 1.56% of the DSP area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A task loading and offloading method of a multicore interface with dynamic task management capability, wherein a communication interface is disposed between a first processor and a second processor, for dynamically managing a task assigned to the second processor by the first processor, the method comprising:
   receiving the task assigned to the second processor by the first processor;
   splitting the task into at least one thread;
   sorting said at least one thread according to priorities of the at least one thread, and recording the at least one thread in a task queue, wherein the task queue records task control block (TCB) data required for executing each of the at least one thread;
   searching an idle processing unit from a plurality of processing units of the second processor;
   assigning one of the at least one thread of the task to the idle processing unit;
   activating the idle processing unit to execute the assigned thread, wherein the method further comprises:
      receiving a first data place-in command for indicating that the first processor has placed data into one of two input buffers in the multicore interface, to update a state register, indicating a state of the input buffer where the data is placed as full, and instructing the first processor to place data into the other input buffer next time; and
      receiving a first data take-out command for indicating that the first processor has taken out the data from one of two output buffers in the multicore interface so as to update the state register, indicating a state of the output buffer where the data is taken out as empty, and instructing the first processor to take out data from the other output buffer next time; and
   repeating the above steps to assign another thread of the task to another idle processing unit in the second processor, until all the at least one thread of the task are executed.

2. The task loading and offloading method of a multicore interface with dynamic task management capability according to claim 1, wherein the step of searching the idle processing unit in the second processor comprises:
   reading a thread dispatch table to view a current working state of each of the processing units in the second processor so as to obtain the processing unit under an idle working state.

3. The task loading and offloading method of a multicore interface with dynamic task management capability according to claim 2, wherein the thread dispatch table is used for recording working states of each of the processing units in the second processor and an address of the TCB data required by each of the processing units for executing the thread.

4. The task loading and offloading method of a multicore interface with dynamic task management capability according to claim 1, wherein the step of assigning one of the at least one thread to the idle processing unit comprises:
   reading the task queue to search the thread that has not be processed currently and listed ahead, and assigning the searched thread to the processing unit.

5. The task loading and offloading method of a multicore interface with dynamic task management capability according to claim 4, wherein the step of assigning one of the at least one thread to the idle processing unit comprises:

recording an address of the TCB data required for executing one of the at least one thread in a thread dispatch table.

6. The task loading and offloading method of a multicore interface with dynamic task management capability according to claim 1, wherein the step of activating the idle processing unit to execute the assigned thread comprises:

enabling a processing unit enable signal corresponding to the idle processing unit; and starting accumulating an instruction counter by the idle processing unit, so as to start executing the assigned thread.

7. The task loading and offloading method of a multicore interface with dynamic task management capability according to claim 6, wherein the step of executing the assigned thread by the idle processing unit comprises:

requesting the communication interface to provide a working space by the idle processing unit;

executing the assigned thread and storing data successfully computed by the assigned thread to the working space; and releasing the working space for storing data required by the thread computation.

8. The task loading and offloading method of a multicore interface with dynamic task management capability according to claim 7, wherein in the step of requesting the communication interface to provide the working space by the idle processing unit, if the communication interface has no idle working space, an execution of the assigned thread is ended.

9. The task loading and offloading method of a multicore interface with dynamic task management capability according to claim 7, after the step of requesting the communication interface to provide the working space by the idle processing unit, further comprising:

instructing the communication interface to update the task queue, to point to the next data to be processed; and once the assigned thread has been executed successfully, instructing the communication interface to update the task queue, so as to indicate that another data to be processed is added to a target thread of the assigned thread, wherein said another data to be processed by the target thread is the data processed by the assigned thread.

10. The task loading and offloading method of a multicore interface with dynamic task management capability according to claim 7, after the step of requesting the communication interface to provide the working space by the idle processing unit, further comprising:

unlocking the assigned thread, for being further assigned to the idle processing unit in the second processor for execution.

11. The task loading and offloading method of a multicore interface with dynamic task management capability according to claim 1, wherein the TCB data comprises a type, a destination, a head pointer, a tail pointer, and a program address of each of the at least one thread.

12. The task loading and offloading method of a multicore interface with dynamic task management capability according to claim 1, wherein the first processor comprises a micro processor unit (MPU), and the second processor comprises a digital signal processor (DSP).

13. A multicore interface with dynamic task management capability, disposed between a first processor and a second processor, comprising:

a first processor controller, coupled to the first processor, for receiving a command from the first processor, and receiving a task assigned to the second processor by the first processor;

a second processor controller, coupled to the first processor controller and the second processor, for receiving a command from the second processor, and searching for an idle processing unit in the second processor;

a task controller, coupled to the second processor controller, for receiving a command from the second processor controller, assigning one of a plurality of threads of the task to the processing unit, and giving a command to the second processor controller to activate the idle processing unit to execute the assigned threat;

two input buffers, for receiving and storing data input by the first processor, and providing the data to the second processor for computation;

two output buffers, for receiving and storing data computed by the second processor, and providing the computed data to the first processor; and a state register, for indicating states of the input buffers and the output buffers, wherein the first processor controller comprises:

receiving a first data place-in command for indicating that the first processor has placed data into one of the input buffers, to update the state register, indicating a state of the input buffer where the data is placed as full, and instructing the first processor to place data into the other input buffer next time; and receiving a first data take-out command for indicating that the first processor has taken out the data from one of the output buffers so as to update the state register, indicating a state of the output buffer where the data is taken out as empty, and instructing the first processor to take out data from the other output buffer next time.

14. The multicore interface with dynamic task management capability according to claim 13, wherein the second processor controller comprises:

receiving a second data take-out command for indicating that the second processor has taken out data from an input buffer, and a second data place-in command for indicating that the second processor has placed the data into an output buffer; and transferring the second data take-out command and the second data place-in command to the first processor controller for execution.

15. The multicore interface with dynamic task management capability according to claim 14, wherein the first processor controller comprises:

receiving the second data take-out command to update the state register, instructing the second processor to take out the data from the other input buffer next time, and indicating the state of the input buffer where the data is taken out as empty; and receiving the second data place-in command to update the state register, instructing the second processor to place the data into the other output buffer next time, and indicating the state of the output buffer where the data is placed as full.

16. The multicore interface with dynamic task management capability according to claim 13, wherein the second processor controller comprises:

receiving a memory get command, to search for a working space for storing data successfully computed by the thread; and receiving a memory release command, to release the working space for storing the data required by the thread computation.

17. The multicore interface with dynamic task management capability according to claim 13, wherein the second processor controller comprises:
    receiving a task unlock command, to unlock a state of the thread, and provide the thread to the task controller for checking whether the thread is dispatchable to the second processor for computation.

18. The multicore interface with dynamic task management capability according to claim 13, wherein the second processor controller comprises:
    receiving a processing unit terminate command, for setting a processing unit enable signal corresponding to the idle processing unit in the second processor, and terminating accumulating an instruction counter; and
    transferring a processing unit idle command to the task controller so as to inform the task controller that the idle processing unit is existed for being rescheduled.

19. The multicore interface with dynamic task management capability according to claim 18, wherein upon receiving the processing unit idle command, the task controller comprises:
    reading a task queue to search for a thread that has not been processed currently and listed ahead and write an address of a TCB data of the thread into a thread dispatch table, wherein the task queue records the TCB data required for executing each of the threads; and
    transferring a processing unit enable command to the second processor controller, to enable the processing unit enable signal of the second processor, and control the idle processing unit of the second processor to start accumulating the instruction counter, so as to execute the thread.

20. The multicore interface with dynamic task management capability according to claim 19, wherein the task controller comprises:
    receiving a de-queue command to update a tail pointer of the TCB data of the thread in the task queue so as to point to the next data to be processed of the thread; and
    receiving an en-queue command to update a head pointer of an TCB data of a target thread of the thread so as to indicate that another data to be processed is added to the target thread, wherein said another data to be processed by the target thread is the data processed by the thread.

21. The multicore interface with dynamic task management capability according to claim 13, wherein the first processor comprises a micro processor unit (MPU), and the second processor comprises a digital signal processor (DSP).

* * * * *